April 8, 1930.  W. E. RICHARD  1,753,533
DYNAMO ELECTRIC MACHINE
Filed July 22, 1927
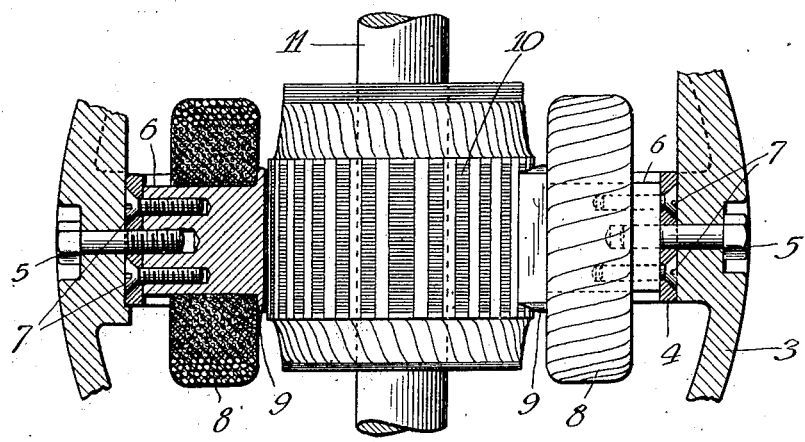
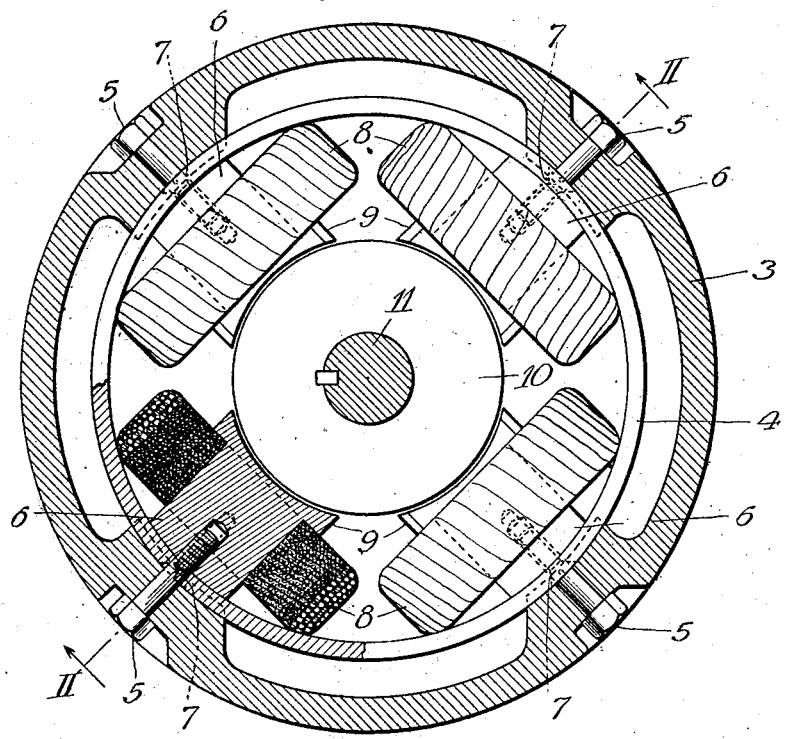
Inventor
William Edward Richard
By Jones, Addington, Ames & Seibold
Attys Patented Apr. 8, 1930

1,753,533

UNITED STATES PATENT OFFICE

WILLIAM EDWARD RICHARD, OF EVANSVILLE, INDIANA, ASSIGNOR TO SUNBEAM ELECTRIC MANUFACTURING COMPANY, OF EVANSVILLE, INDIANA, A CORPORATION OF INDIANA

DYNAMO-ELECTRIC MACHINE

Application filed July 22, 1927. Serial No. 207,628.

My invention relates to dynamo-electric machines and has particular relation to a method of constructing motors and generators that are to be mounted in relatively inaccessible positions.

It is extremely difficult to make repairs and replacements of parts of electric motors and generators that are mounted in inaccessible positions, such, for example, as on the top of a steam locomotive boiler where the head-light generator is ordinarily mounted. Such generators and motors and dynamo-electric machines for numerous other applications have been so mounted that it was necessary to remove the whole machine from its mounting in order to permit any repairs or replacements to be made.

The object of my invention is to provide such a construction for these machines that repairs and replacements may be made with a much greater degree of efficiency and convenience than has previously been obtainable.

This result is accomplished by providing a relatively light annular member of magnetizable material that is adapted to be secured in close-fitting relation within the main frame portion of the dynamo-electric machine by bolts or other readily removable means. The annular member supports the pole-pieces and field-magnet coils of the dynamo-electric machines which are secured to said annular member by bolts or other readily removable means to constitute a removable unit which may be readily inserted in and removed from the main frame portion of the dynamo-electric machine. When it it necessary to repair or replace parts of the field portion of the machine, the whole field-magnet assembly may be readily removed from the frame as a unit, and, likewise, may be readily replaced. The actual repairs may thus be made in any convenient place and are not hindered by reason of the inaccessibility of the machine itself wherever such machine is mounted.

My invention will be better understood by referring to the following detailed description in conjunction with the accompanying drawings, in which Figure 1 is a central vertical sectional view of a dynamo-electric machine constructed in accordance with my invention; and Fig. 2 is a fragmentary sectional view taken along the line II—II of Fig. 1.

Referring to the drawings, a dynamo-electric machine comprises a main frame portion 3 of magnetizable material which may be mounted in any desired manner with respect to the other apparatus with which the dynamo-electric machine is to be associated. An annular member 4 is adapted to be secured in close-fitting relation within the frame 3 by cap-screws 5. The cap-screws 5 extend through suitable apertures in the frame 3 and the annular member 4 and into screw-threaded apertures in pole-pieces 6 that are secured within the annular member 4 by flat-headed screws 7. The screws 7 extend through countersunk apertures in the annular member 4 into screw-threaded apertures in the pole-pieces 6 and are adapted to secure the pole-pieces in fixed relation with respect to the annular member 4 independently of the cap-screws 5.

The pole-pieces 6 are provided with field-magnet coils 8 which are held in position with respect thereto by face portions 9 of the pole-pieces. The face portions 9 provide a path for conducting magnetic flux to an armature member 10 of the dynamo-electric machine which is mounted upon a suitable shaft 11.

It will be seen that the construction as shown and described permits the assembly of the field-magnet portion of a dynamo-electric machine in a single unit outside the frame of the machine. This unit comprises the annular member 4, the pole-pieces 6, and the field magnet coils 8, which elements are assembled by means of the screws 7. The field-magnet assembly, when thus completed, may be readily inserted in the frame 3 of the machine and secured in fixed position therein by means of the cap-screws 5. However inaccessible the mounting of the machine itself may be, the field-magnet assembly may be removed for the purpose of making repairs or replacements with a minimum of labor at the place where the machine is mounted.

The construction of a dynamo-electric machine in accordance with my invention does not involve any additional weight, as the annular member 4 may be made of steel to constitute a portion of the external magnetic circuit of the machine, thus permitting a proportional decrease in the cross-sectional area, and, therefore, in the weight, of the frame 3. The additional expense of providing the annular member 4 is so slight as to be greatly overbalanced by the important advantage obtained by utilizing this type of construction.

While I have shown only one specific embodiment of my invention, it will be understood that various modifications may be made in the details of construction without departing from the spirit and scope of my invention, as set forth in the appended claims.

I claim as my invention:

1. A dynamo-electric machine comprising a supporting frame constituting the principal portion of the external magnetic circuit of the machine, an annular member adapted to be disposed within said frame, a plurality of magnetizable pole-pieces, means for removably securing said pole-pieces within said annular member and means for removably securing said annular member within said frame independently of said first-mentioned securing means.

2. A dynamo-electric machine comprising a supporting frame constituting the principal portion of the external magnetic circuit of the machine, an annular member of magnetizable material adapted to be disposed within said frame, a plurality of magnetizable pole-pieces, means for removably securing said pole-pieces within said annular member, and means for removably securing said annular member within said frame independently of said first-mentioned securing means.

3. A dynamo-electric machine comprising a supporting frame constituting the principal portion of the external magnetic circuit of the machine, an annular member of magnetizable material adapted to be disposed within said frame, a plurality of magnetizable pole-pieces, a field-magnet coil for each of said pole-pieces, means for removably securing said pole-pieces and said field-magnet coils within said annular member and means for removably securing said annular member within said frame independently of said first-mentioned securing means.

4. A dynamo-electric machine comprising a supporting frame constituting the principal portion of the external magnetic circuit of the machine, an annular member of magnetizable material adapted to be disposed in close-fitting relation within said frame to constitute the remaining portion of the external magnetic circuit of the machine, a plurality of pole-pieces of magnetizable material, a plurality of screws for securing said pole-pieces within said annular member and a plurality of screws for securing said annular member within said supporting frame independently of said first-mentioned screws.

5. A dynamo-electric machine comprising a supporting frame constituting the principal portion of the external magnetic circuit of the machine, an annular member of magnetizable material adapted to be disposed in close-fitting relation within said frame to constitute the remaining portion of the external magnetic circuit of the machine, a plurality of pole-pieces of magnetizable material, a field-magnet coil for each of said pole-pieces, a plurality of screws for securing said pole-pieces and said field-magnet coils in fixed position within said annular member and a plurality of screws for securing said annular member in fixed position within said supporting frame independently of said first-mentioned screws.

In witness whereof, I have hereunto subscribed my name.

WILLIAM EDWARD RICHARD.